(12) United States Patent
Arroyo et al.

(10) Patent No.: US 12,505,171 B2
(45) Date of Patent: Dec. 23, 2025

(54) TWINNING BASED ON MACHINE LEARNING RANKING

(71) Applicant: Kantar Group Limited, New York, NY (US)

(72) Inventors: Aaron Arroyo, Monroe, CT (US); Peter Stolz, Reading, CT (US); Keith Kohrs, Seattle, WA (US); Prasad Viswanath, Frisco, TX (US)

(73) Assignee: Kantar Group Limited, New York, NY (US)

( * ) Notice: Subject to any disclaimer, the term of this patent is extended or adjusted under 35 U.S.C. 154(b) by 200 days.

(21) Appl. No.: 18/341,925

(22) Filed: Jun. 27, 2023

(65) Prior Publication Data
US 2025/0005097 A1    Jan. 2, 2025

(51) Int. Cl.
*G06F 16/958*    (2019.01)
*G06F 16/9535*    (2019.01)

(52) U.S. Cl.
CPC ........ *G06F 16/958* (2019.01); *G06F 16/9535* (2019.01)

(58) Field of Classification Search
CPC ............................ G06F 16/958; G06F 16/9535
See application file for complete search history.

(56) References Cited

U.S. PATENT DOCUMENTS

| | | | |
|---|---|---|---|
| 10,445,766 B1* | 10/2019 | Barbier | H04N 21/2407 |
| 2019/0163710 A1* | 5/2019 | Haghighat Kashani | G06Q 30/0271 |
| 2019/0182059 A1 | 6/2019 | Abdou et al. | |
| 2020/0034874 A1* | 1/2020 | Narayan | G06Q 30/0277 |

OTHER PUBLICATIONS

International Search Report and Written Opinion on PCT Application PCT/US2024/034342 dated Oct. 1, 2024.

* cited by examiner

*Primary Examiner* — Tyler J Torgrimson
(74) *Attorney, Agent, or Firm* — Foley & Lardner LLP

(57) ABSTRACT

Twinning is disclosed based on parameter ranking. A system can include a data processing system. The data processing system can include one or more processors, couple with memory. The data processing system can receive identifiers of computing devices of a cell that accessed digital content. The data processing system can receive parameters linked with the identifiers. The data processing system can determine, based on the parameters and a model trained with machine learning, a ranking of the parameters. The data processing system can generate, based on the ranking of the parameters, a twin of the cell comprising identifiers of computing devices that did not access the digital content.

20 Claims, 4 Drawing Sheets

TWINNING BASED ON MACHINE LEARNING RANKING

INTRODUCTION

A system can determine the performance of digital content. The system can compare a control group against an exposed group to determine the performance of the digital content.

SUMMARY

At least one aspect of the present disclosure is directed to a system. The system can include a data processing system including one or more processors, coupled with memory. The data processing system can receive identifiers of computing devices of a cell that accessed digital content. The data processing system can receive parameters linked with the identifiers. The data processing system can determine, based on the parameters and a model trained with machine learning, a ranking of the parameters. The data processing system can generate, based on the ranking of the parameters, a twin of the cell comprising identifiers of computing devices that did not access the digital content.

At least one aspect of the present disclosure is directed to a method. The method can include receiving, by a data processing system comprising one or more processors, coupled with memory, identifiers of computing devices of a cell that accessed digital content. The method can include receiving, by the data processing system, parameters linked with the identifiers. The method can include determining, by the data processing system, based on the parameters and a model trained with machine learning, a ranking of the parameters. The method can include generating, by the data processing system, based on the ranking of the parameters, a twin of the cell comprising identifiers of computing devices that did not access the digital content.

At least one aspect of the present disclosure is directed to one or more storage medium that store instructions thereon, that, when executed by one or more processors, cause the one or more processors to receive identifiers of computing devices of a cell that accessed digital content. The instructions can cause the one or more processors to receive parameters linked with the identifiers. The instructions can cause the one or more processors to determine, based on the parameters and a model trained with machine learning, a ranking of the parameters. The instructions can cause the one or more processors to generate, based on the ranking of the parameters, a twin of the cell comprising identifiers of computing devices that did not access the digital content.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
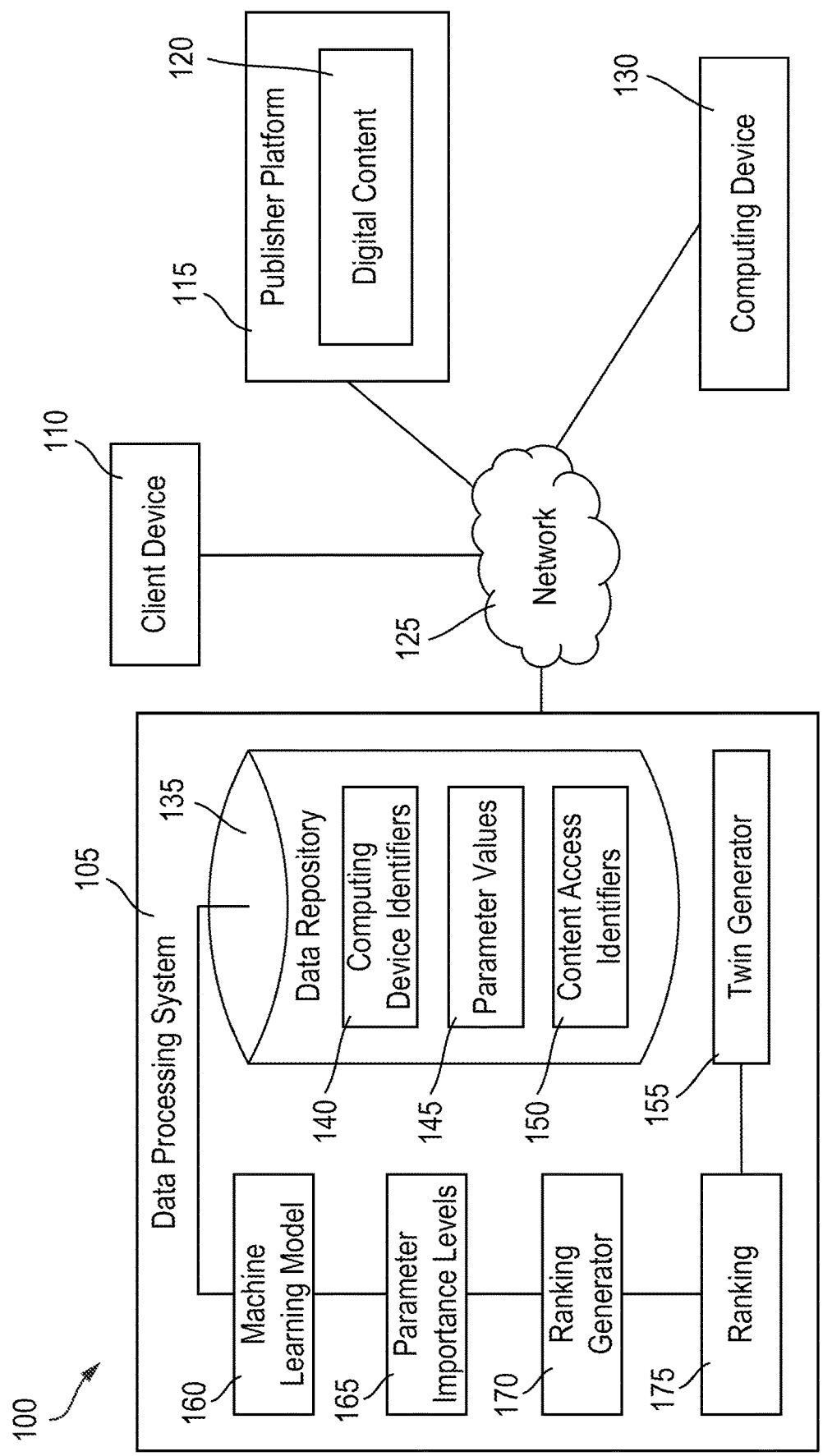
FIG. 1 is an example system that generates a twin of a cell of identifiers of computing devices that accessed digital content with a ranking of parameters.

Following below are more detailed descriptions of various concepts related to, and implementations of, methods, apparatuses, and systems of twinning. The various concepts introduced above and discussed in greater detail below may be implemented in any of numerous ways.

A system can perform or run experiments to determine the performance of digital content. The experiment can define a control cell of computing devices that did not access the content and define an exposed cell of computing devices that did access the content. The system can store a cell of exposed device identifiers of devices that accessed digital content, and generate a cell of device identifiers of devices that did not access the digital content. Based on a comparison of the cells, the system can determine the performance of the digital content. However, if the exposed cell and control cell are generated only based on whether the computing devices accessed the digital content or not, the profiles and behaviors of users of the computing devices between the two cells may differ, and therefore, there may be error in the determination of the performance of the digital content.

To determine the performance of the digital content accurately, the system can limit the experiment to a single variable, such as whether or not a computing device accessed the digital content. Other parameters for the experiment may need to be held constant, or held as constant as possible. The system can generate the control cell with a ranking of parameters where the parameters include demographic data, characteristic data, or other information describing the users of the computing devices. The ranking can be predefined, and indicate the importance of certain parameters with respect to other parameters. The system can generate the control cell based on the ranking of parameters such that the control cell includes computing identifiers associated with parameters that are similar to parameters of the exposed cell. When generating the control cell, the system can place a greater emphasis on high-ranking parameters of the ranking and a lower emphasis on low-ranking parameters of the ranking.

However, the ranking used may be predetermined and used across multiple experiments. Because the ranking may not be designed to be specific to an experiment, the ranking can introduce bias and error. To correct and compensate for the bias, one or multiple compensation algorithms can be run, but these algorithms can consume large amounts of processing resources, such as memory usage, processor usage, processing time, and require significant amounts of power consumption and cause significant amounts of heat generation.

To solve for these, and other technical issues, this technical solution can utilize machine learning to generate a parameter ranking and construct a twin or digital twin of a cell of identifiers of computing devices that accessed digital content with the parameter ranking. The twin cell can be a list of comparable, unexposed users or identifiers of computing devices of the users that did not access the digital content. The twin cell can include similar parameters as the exposed cell, e.g., similar demographics, behavior, media consumption.

The system can execute a machine learning model to determine which parameters are most important in predicting a target. For example, the system can use the machine learning model to identify which parameters are most influential or important in predicting whether a particular computing device accessed the digital content. Based on the importance levels determined for the parameters, the system can generate a ranking which ranks the parameters from most important to least important. The system can determine the twin cell based on the ranking, such that the twin is similar to the cell of identifiers of the computing devices that accessed the digital content. This high level of similarity can reduce or remove bias or error in the experiment. The high level of similarity can remove survey bias by limiting the test variable to access of the digital content. More relative insights to a specific client and a campaign audience can be generated. Furthermore, the machine learning implementation can provide experiment specific rankings, and consume less processing resources or power resources compared to other solutions that attempt to reduce the bias.

Referring now to FIG. 1, among others, a system 100 that generates a twin of a cell of identifiers of computing devices that accessed digital content with a ranking of parameters is shown. The system 100 can be a group, collection, or network of apparatus, devices, systems, or platforms. The system 100 can include at least one data processing system 105. The data processing system 105 can include at least one computer, computing device, computing system, server, server farm, server network, or any other centralized or distributed processing system or environment. The data processing system 105 can be coupled with at least one publisher platform 115, at least one client device 110, or at least one computing device 130. In some implementations, the data processing system 105 and the publisher platform 115 can be part of the same system, device, or computing system.

The data processing system 105, the client device 110, the publisher platform 115, and the computing device 130 can communicate over at least one network 125. The network 125 can be or include the Internet, a Wide Area Network (WAN), a Local Area Network (LAN), a Wi-Fi network, a cellular network (e.g., a 3G network, a 4G network, or a 5G network). The network 125 can be or include a wired or wireless network. The network 125 can include modems, routers, network switches, cell towers, network repeaters, antennae.

At least one publisher platform 115 can deliver, provide, or transmit digital content 120 to at least one computing device 130. For example, the publisher platform 115 can provide digital content 120 to a single computing device 130 or multiple computing devices 130. The publisher platform 115 can provide the digital content 120 to computing devices 130 as part of a campaign where one or multiple different pieces of digital content 120 are provided to targeted computing devices 130. The digital content 120 can include images, pictures, links, videos, frames, audio, or other data that can be accessed by the computing devices 130. The computing device 130 can cause the digital content 120 to be displayed on a display device of the computing device 130, a video to play on a display device of the computing device 130, or audio to play on a speaker of the computing device 130. In some implementations, the digital content 120 is physical content, such as content printed on a billboard, printed in a newspaper, magazine, or book, content played on a radio station, or content displayed on television. The computing device 130 or the client device 110 can be smartphones, laptop computers, desktop computers, set-top boxes, smart televisions, tablets, smart watches, or augmented or virtual reality headsets.

The system 100 can collect and analyze data received from various devices that accessed, were exposed to, or received digital content 120. For example, the digital content 120 can include tracking pixels, tracking tags, or other pieces of information that can transmit data to the data processing system 105 describing or identifying the computing device 130 that accessed the digital content 120. The data processing system 105 can store a content access identifier 150, which can be a value (e.g., binary value) that indicates whether a particular computing device 130 associated with a particular computing device identifier 140 accessed or did not access a particular piece of digital content 120. The computing device 130 can access a website, web-page, mobile application, software application, or other electronic system of the publisher platform 115. Responsive to accessing the electronic system of the publisher platform 115, the publisher platform 115 can cause the digital content 120 to be transmitted to the computing device 130. The computing device 130 can receive, download, or present the digital content 120 to a user of the computing device 130 responsive to receiving the digital content 120 from the publisher platform 115.

The data processing system 105 can include at least one data repository 135. The data repository 135 can be or include a database, data storage system, a data lake, a very large database (VLDB), a relational database, a structured query language (SQL) database, a not only SQL (NoSQL) database, or a graph database. The data processing system 105 can receive, collect, or aggregate data and store the data in the data repository 135. The data processing system 105 can collect the data from the publisher platform 115, the client device 110, or the computing device 130. For example, the data processing system 105 can receive computing device identifiers 140, parameter values 145, or content access identifiers 150. The data processing system 105 can store the computing device identifiers 140, parameter values 145, or content access identifiers 150 in the data repository 135.

The data processing system 105 can receive computing device identifiers 140 of computing devices 130 that accessed the digital content 120. The identifiers 140 can include device identifiers of the computing devices 130, such as device identifiers, tracking tag identifiers, tracking pixel identifiers, email addresses, login names, or user identifiers. The identifiers 140 can be anonymized such that the identifiers 140 do not include any personal identifying information. The data processing system 105 can receive identifiers 140 of a cell that accessed the digital content 120. For example, a cell can be a group, set, or collection of identifiers 140 representing the computing devices 130 that accessed the digital content 120. The cell can be a data structure, set of data memory addresses, or section of the data repository 135, that stores the identifiers 140 of the computing devices 130 that accessed the digital content 120. The data processing system 105 can store the cell within the data repository 135 or retrieve the cell from the data repository 135. The data repository 135 can include multiple cells, each cell linked to a particular piece of digital content 120 and storing the identifiers 140 of the computing devices 130 that accessed the particular digital content 120. The data processing system 105 can receive the identifiers 140 of the cell for the digital content 120 and provide the identifiers 140 to a machine learning model 160.

The data processing system 105 can receive parameters or parameter values 145 for the computing devices 130. The parameters can be categories or types of categories for a parameter value or variable value. The parameter values 145 can indicate entries, values, levels, or data for a particular category. The parameter values 145 can be linked with the identifiers 140 of the computing devices 130. For example, the data processing system 105 can store the parameter values 145 in the data repository 135 and link, relate, or connect the parameter values 145 with the computing identifiers 140. The data repository 135 can provide a relationship indicating that for a particular identifier 140, one or multiple parameter values 145 are related to the identifier. For example, parameters could be geographic region, age, gender, personal income, household income, whether a user has dependents, the number of the dependents of the user, marital status, employment status, site visitation behavior. The parameter values 145 can indicate specific values, levels, binary indicators, for the parameters. For example, for a particular user associated with a computing device identifier 140, the user might have parameter values 145 indicating that the user is from New York, the user is thirty-seven years old, the user is male, the user has an income level below six figures, the user has no dependents, the user is not married, and that the user is employed. The data processing system 105 can collect the parameter values 145 from the computing device 130 or the publisher platform 115. The data processing system 105 can store the parameter values 145 in the data repository 135. The data processing system 105 can retrieve the parameter values 145 from the data repository 135. The data processing system 105 can provide the parameter values 145 to the machine learning model 160.

The machine learning model 160 can be a model, a machine learning algorithm, or a model trained with a machine learning algorithm. The machine learning model 160 can be a supervised or unsupervised machine learning model. For example, the machine learning model 160 can recognize or identify patterns in data without any, or with minimal, user supervision. The machine learning model 160 can be a model or algorithm that scores the importance of input parameters, features, or variables. For example, for a set of input parameters, the machine learning model 160 can output an importance level 165 for each parameter or at least one parameter. The importance level 165 can be a number value that indicates how useful the parameter is in predicting a particular target.

For example, the machine learning model 160 can receive computing device identifiers 140 and the parameter values 145 for the computing device identifiers 140. The machine learning model 160 can further receive the content access identifiers 150 from the data repository 135. The target of the machine learning model 160 can be the content access identifier 150, indicating whether the computing devices 130 identified by the computing device identifiers 140 accessed the digital content 120. The machine learning model 160 can determine, based on the parameter values 145 for the computing device identifiers 140, the parameter importance levels 165 for the parameters. The parameter importance levels 165 can indicate the importance of each parameter in predicting the content access identifier 150. For example, the parameter importance levels 165 can indicate how important each parameter is in predicting whether a particular computing device 130 accessed the digital content 120.

The data processing system 105 can determine, based on the parameters and machine learning model 160, the ranking 175 of the plurality of parameters. The machine learning model 160 can be executed by the data processing system 105 based on first parameter values 145 linked with first computing device identifiers 140 that accessed the digital content 120 (e.g., the first computing device identifiers 140 can be linked with first content access identifiers 150 indicating that first computing devices 130 accessed the digital content 120). The machine learning model 160 can be executed by the data processing system 105 based on second parameter values 145 linked with second computing device identifiers 140 that did not access the digital content 120 (e.g., the second computing device identifiers 140 can be linked with second content access identifiers 150 indicating that second computing devices 130 did not access the digital content 120). The machine learning model 160 can execute on both the first parameter values 145, the second parameter values 145, the first computing device identifiers 140, the second computing devices identifiers 140, the first content access identifiers 150, and the second content access identifiers 150.

The data processing system 105 can include at least one ranking generator 170. The ranking generator 170 can generate or determine the ranking 175 based on the parameter importance levels 165. The data processing system 105 can rank the parameters from highest importance level to lowest importance level based on the parameter importance levels 165. The ranking 175 can include a number of levels, e.g., a top level, one or more middle levels, and a bottom level. The ranking generator 170 can map the parameters to the levels of the ranking 175 based on the parameter importance levels 165. The ranking generator 170 can link, relate, or map a number of parameters with the highest parameter importance levels 165 to the number of levels of the ranking 175.

For example, the client device 110 can provide an input to the data processing system 105 indicating a number of parameters or levels that should be included within the ranking 175. For example, the client device 110 can provide an input indicating that the ranking 175 should include seven parameters. The ranking generator 170 can, based on the input received from the client device 110, select seven parameters associated with the highest parameter importance levels 165. The ranking generator 170 can generate the ranking 175 to order the seven parameters from highest importance level 165 to lowest importance level 165.

The ranking generator 170 can include or store a threshold. The threshold can be a predetermined value stored by the ranking generator 170. The client device 110 can provide the threshold to the data processing system 105. The ranking generator 170 can select a portion of parameters by comparing the parameter importance levels 165 to the threshold. Any parameter with an importance level 165 greater than or equal to the threshold can be included within the ranking 175. Any parameter with an importance level 165 less than the threshold can be discarded, or excluded from the ranking 175. Parameters with importance levels 165 less than the threshold may not be included within the ranking 175.

The data processing system 105 can include a twin generator 155. The twin generator 155 can generate a twin or digital twin of a cell of computing device identifiers 140 that accessed the digital content 120. The twin generator 155 can generate a twin of the cell by generating another cell, group, collection, or set of computing device identifiers 140. The twin generator 155 can generate the twin to include computing device identifiers 140 that did not access the digital content 120. The twin generator 155 can generate the twin of the cell with the ranking 175. Because the ranking 175 can indicate the importance of each parameter, the twin generator 155 can generate a group of computing device identifiers 104 that did not access the digital content 120. With the twin of the cell, the data processing system 105 can determine the performance, lift, or score for the digital content 120. The data processing system 105 can determine the performance of the digital content 120 based on numbers of conversions that the digital content 120 drove for computing devices 130 within the cell and computing devices 130 in the twin cell generated by the twin generator 155.

The twin generator 155 can generate the twin cell with computing device identifiers 140 that did not access the digital content 120, but access other content or second digital content of the same publisher. For example, the twin generator 155 can determine a group of the identifiers 140 that all accessed content of a particular publisher (e.g., the same publisher that published the digital content 120). The twin generator 155 can then generate the twin with the group of the identifiers and the ranking 175. For example, the twin of the cell can be generated by selecting at least some of the identifiers of the group. Therefore, the resulting cell can include identifiers 140 of computing devices 130 that access the same publisher, although the twin can include identifiers that did not access the same digital content as the original cell.

The twin generator 155 can generate the twin on a campaign level. For example, the twin generator 155 can generate the twin to include identifiers 140 of computing devices 130 that accessed digital content of a campaign of a publisher that is the same campaign that included the digital content 120, or is a different campaign of the same publisher. For example, the data processing system 105 can identify a first campaign including the digital content, and a second campaign of the same publisher including second different digital content. The twin generator 155 can identify computing device identifiers 140 that accessed content of the second campaign, but did not access content of the first campaign or did not access the digital content 120 of the first campaign. With the selected identifiers 140 and the ranking 175, the twin generator 155 can generate a twin of the cell.

Figure 2:
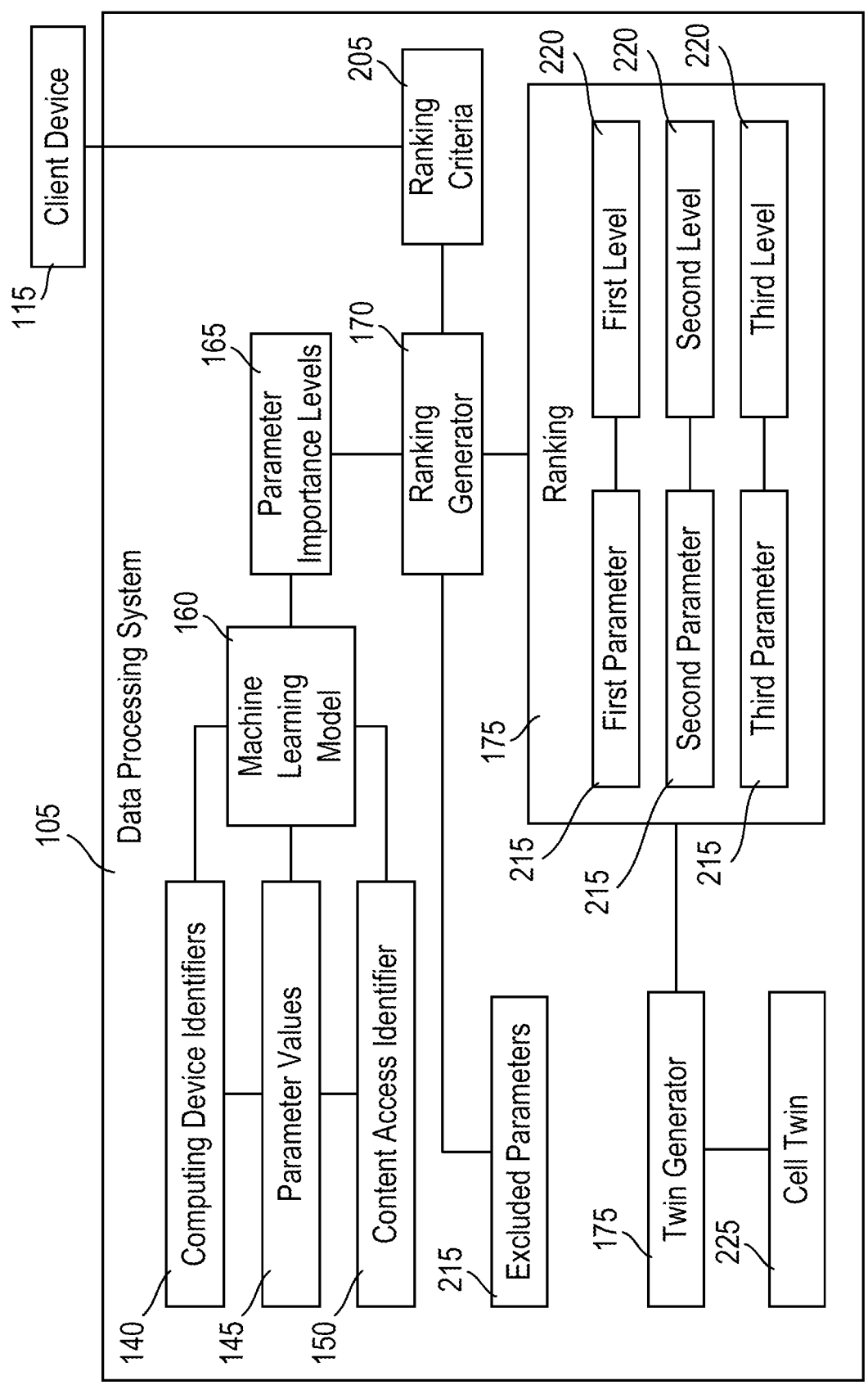
FIG. 2 is an example system that generates a ranking of parameters based on a model trained by machine learning.

Referring now to FIG. 2, among others, the data processing system 105 that generates a ranking of parameters 215 based on a model trained by machine learning model 160 is shown. The data processing system 105 can receive the computing device identifiers 140, the parameter values 145, and the content access identifiers 150. Each computing device identifier 140 can be linked to parameter values 145 and a content access identifier 150. For example, for a particular identifier 140, a set or group of parameter values 145 describing characteristics of the corresponding computing device 130 or user of the computing device 130 can be linked. For example, for a computing device identifier 140, the parameter values 145 could indicate that the user of the computing device 130 identified by the computing device identifier 140 is female, located in New York City, located in the U.S., has a particular income level. The content access identifier 150 can indicate that the user accessed the digital content 120. For example, the data repository 135 can store rows and columns, e.g., a row for every computing device identifier 140 with entries for the parameter values 145 in columns and the content access identifier 150 in another column.

The machine learning model 160 can receive the computing device identifiers 140, the parameter values 145, and the content access identifier 150 as an input. The machine learning model 160 can generate or output the parameter importance levels 165 based on the computing device identifiers 140, the parameter values 145, and the content access identifiers 150. The machine learning model 160 can generate a first importance level for a first parameter 215, a second importance level 165 for a second parameter 215, a third importance level 165 for a third parameter. The machine learning model 160 can determine or generate an importance level 165 for any number of parameters 215.

The ranking generator 170 can generate the ranking 175 based on the parameter importance levels 165. The ranking generator 170 can generate the ranking 175 to map parameters 215 with levels 220. For example, the ranking 175 can be a hierarchy of levels 220, where the levels 220 are slots, ranking numbers, or identifiers which specify the ranking of each parameter 215 with respect to each other parameter 215.

The ranking generator 170 can link, relate, assign, or connect the parameters 215 to the levels 220 based on the importance levels 165 of the parameters 215. For example, the ranking generator 170 can generate the ranking 175 to map the parameters 215 to levels 220 based on the importance levels 165. For example, the first parameter 215 can be associated with a first importance level 165 and be mapped to a first level 220. A second parameter 215 can be associated with a second importance level 165 and be mapped to a second level 220. A third parameter 215 can be associated with a third importance level 165 and be mapped to a third level 220. The first level 220 can be above the second level 220, the second level 220 can be above the third level 220, the third level can be above a fourth level, etc. The parameters 215 can be mapped to the levels 220 from the highest parameter importance level 165 to the lowest parameter importance level 165. For example, a first parameter 215 associated with a highest parameter importance level 165 can be mapped to the first level 220 by the ranking generator 170, while a second highest parameter importance level 165 of a second parameter can cause the ranking generator 170 to map the second parameter 215 to the second level 220.

The ranking generator 170 can receive at least one ranking criteria 205. The ranking criteria 205 can be an indication of the number of levels 220 or the number of parameters 215 to be included in the ranking 175. The criteria 205 can indicate an importance level threshold. The criteria 205 can indicate that only parameters 215 with an importance level 165 above a threshold should be included in the ranking 175. The ranking criteria 205 can indicate that certain parameters 215 should be included at certain levels 220, regardless of the parameter importance levels 165 for the parameters 215. The ranking criteria 205 can be predefined data stored by the data processing system 105. The ranking criteria 205 can be provided to the data processing system 105 by the client device 110. The ranking generator 170 can generate the ranking 175 based on the ranking criteria 205. At least one parameter 215 can be excluded from the ranking 175. For example, if the parameter 215 or the importance level 165 of the parameter 215 does not satisfy or meet the criteria 205, the parameter 215 can be excluded from the ranking 175. For example, the ranking generator 170 can include a first parameter 215 within the ranking based on a first parameter importance level 165 of the first parameter, but exclude a second parameter 215 based on the second importance level of the second parameter. For example, the first importance level 165 can satisfy the criteria 205 and therefore, the first parameter 215 can be included within the ranking 175, but the second importance level 165 may not satisfy the criteria, and therefore, the second parameter 215 can be excluded from the ranking 175.

The ranking generator 170 can generate the ranking 175 based on at least one predefined mapping between a parameter 215 and a level 220 indicated by the ranking criteria 205. For example, the criteria 205 can indicate one or more predefined rankings for the ranking 175. For example, the criteria 205 can indicate that income should be ranked as the highest parameter in the ranking or gender should be ranked as the second highest parameter in the ranking, regardless of the importance levels 165 of the income and gender parameters. The ranking generator 170 can first generate the ranking 175 with the predefined rankings, and then generate or fill the remaining levels 220 with parameters 215 based on the parameter importance levels 165. For example, for remaining levels 220, the ranking generator 170 can map the parameters 215 in the remaining levels 220 based in order of importance levels 165 of the parameters 215.

The ranking generator 170 can generate the ranking 175 based on a specified or predetermined number of levels 220 or parameters 215 for the ranking 175 indicated by the ranking criteria 205. The ranking generator 170 can select a portion of the parameters 215 based on the predefined number. The number of parameters 215 selected can be the number indicated by the ranking criteria 205. The ranking generator 170 can select the number of parameters 215 that are associated with the highest importance levels 165. The ranking generator 170 can generate the ranking with the selected parameters 215.

The twin generator 170 can generate a cell twin 225 based on the ranking 175. For example, the twin generator 170 can search through the computing device identifiers 140 and the parameter values 145 to identify a sub-set or group of computing device identifiers 140 that did not access the digital content 120, but are similar to the users or computing devices 130 that did access the digital content 120. The twin generator 170 can compare the parameter values 145 of computing device identifiers 140 of computing devices 130 that did access the digital content 120 with parameter values 145 of computing device identifiers of computing devices 130 that did not access the digital content 120. The ranking 175 can indicate how important each parameter 215 is in the comparison. The twin generator 170 can implement a machine learning model to form the cell twin 225, and receive the ranking 175, the computing device identifiers 140, the parameter values 145, and the content access identifiers 150 as an input. The machine learning model can output the cell twin 225. The cell twin 225 can be a segment of data, a set of addresses, or other data structure that stores a set of computing device identifiers 140 that did not access the digital content 120 but resemble the computing device identifiers 140 that accessed the digital content 120.

Figure 3:
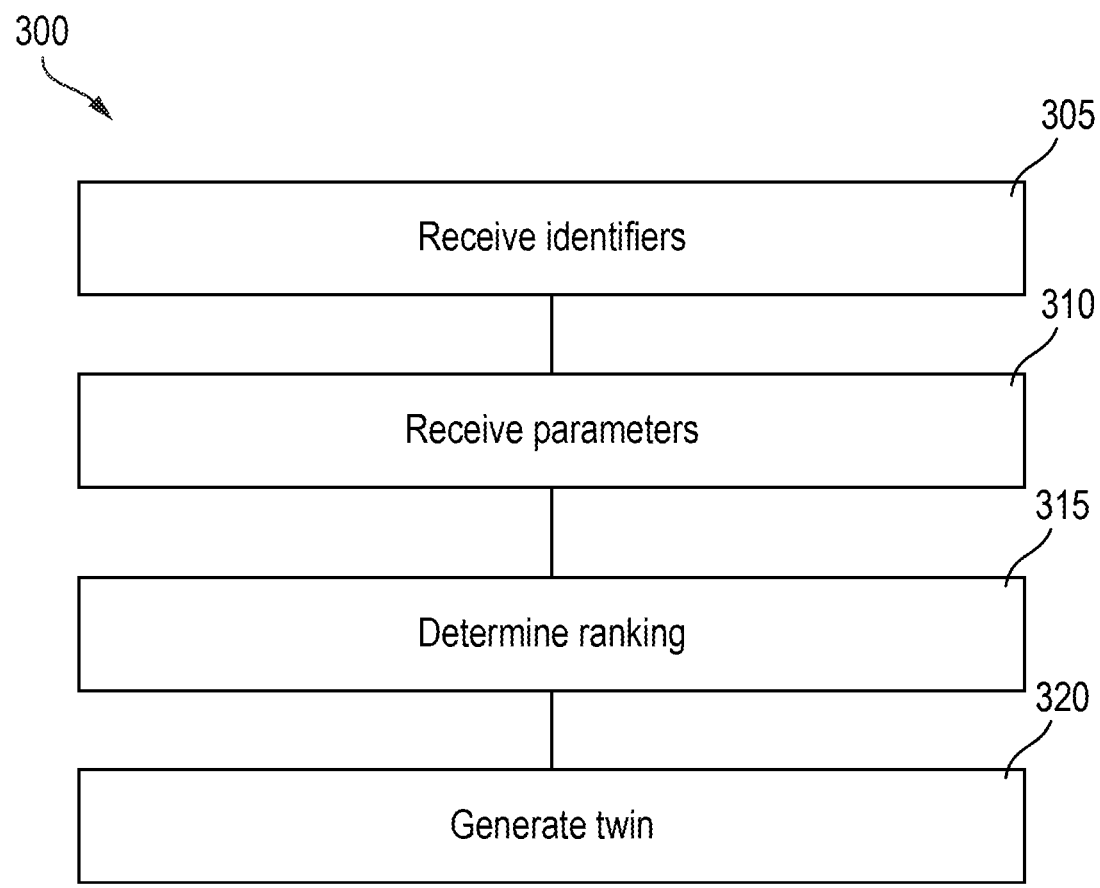
FIG. 3 is an example method of generating a twin of a cell of identifiers of computing devices that accessed digital content with a ranking of parameters.

Referring now to FIG. 3, among others, a method 300 of generating a twin of a cell of identifiers of computing devices that accessed digital content with a ranking of parameters is shown. The data processing system 105, the client device 110, the publisher platform 115, or the computing device 130 can perform at least a portion of the method 300. The method 300 can include an ACT 305 of receiving identifiers. The method 300 can include an ACT 310 of receiving parameters. The method 300 can include an ACT 315 of determining a ranking. The method 300 can include an ACT 320 of generating a twin.

At ACT 305, the method 300 can include receiving, by the data processing system 105, identifiers. The data processing system 105 can receive computing device identifiers 140 that identify the computing devices 130. The data processing system 105 can receive identifiers 140 of computing devices 130 that accessed the digital content 120, and identifiers 140 of computing devices 130 that did not access the digital content 120. The data processing system 105 can receive the identifiers directly from the computing device 130, from the publisher platform 115, or from digital content 120 responsive to the digital content 120 being accessed by the computing devices 130.

The data processing system 105 can receive or generate a content access identifier 150. The content access identifier 150 can indicate whether a particular computing device 130 accessed or did not access the digital content 120. The content access identifiers 150 can be linked with the computing device identifiers 140. For example, each computing device identifier 140 can have a corresponding content access identifier 150 indicating whether the computing device 130 accessed the digital content 120 or did not access the digital content 120. The identifiers 140 can be identifiers of a cell or group that defines computing devices 130 that accessed a particular piece of digital content 120.

At ACT 310, the method 300 can include receiving, by the data processing system 105, parameters. For example, the data processing system 105 can receive parameters 215 or parameter values 145. For example, the data processing system 105 can receive parameters 215 and parameter values 145 for each computing device identifier 140. The parameter values 145 can be values, strings, or other pieces of data for specific parameters or variables that define characteristics, conditions, or statuses of the computing device 130 or a user of the computing device 130. For example, the parameter values 145 could indicate that a user is male for a gender parameter, the user is high income for an income parameter, the user is from Canada for a country parameter, the user is from Victoria for a city parameter, and the user has hockey for a hobby or interest category.

At ACT 315, the method 300 can include determining, by the data processing system 105, a ranking. For example, the data processing system 105 can generate the ranking 175 to order the parameters 215 in a hierarchy. The ranking 175 can map the parameters 215 to levels 220 of the ranking 175. The ranking 175 can be generated or determined by the ranking generator 170 to rank the parameters 215 based on the parameter importance levels 165. The parameters 215 can be ranked from most important to least important parameter 215 based on the parameter importance levels 165. The ranking generator 170 can select a predefined number of the parameters 215 with the highest importance levels 165. The ranking generator 170 can select parameters 215 for generating the ranking 175 that have importance levels 165 that are greater than a threshold. The ranking generator 170 can exclude the remaining parameters 215 from the ranking 175. The ranking generator 170 can include predefined ranking 175. For example, regardless of the importance levels 165 of certain parameters 215, the ranking generator 170 can map the parameters to predefined levels 220 of the ranking 175.

At ACT 320, the method 300 can include generating, by the data processing circuit 105, a twin. For example, the data processing circuit 105 can generate the cell twin 225. The cell twin 225 can include a group or collection of computing device identifiers 140 that did not access the digital content 120, but are similar to the cell of identifiers 140 that did access the digital content 120. In this regard, the cell 225 can be a twin of the cell that accessed the digital content 120. The twin generator 155 can execute one or more matching, grouping, or analysis processes or models to generate the cell twin 225. The twin generator 155 can use the ranking 175 to weight the parameters 215 when forming the cell twin 225 by identifying identifiers 140 of computing devices 130 that did not access the digital content 120.

Figure 4:
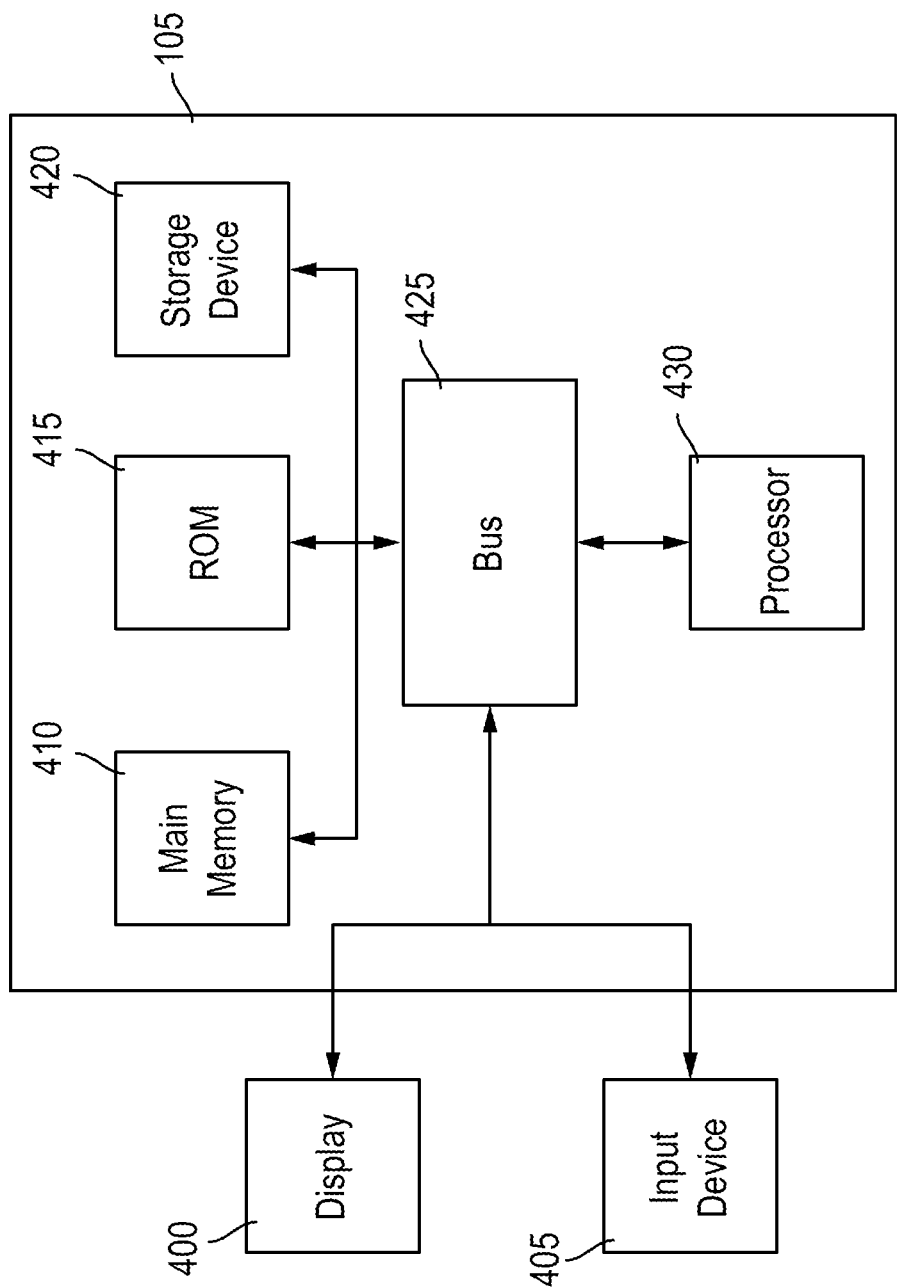
FIG. 4 is an example computing architecture of a data processing system.

Referring now to FIG. 4, among others, an example block diagram of the data processing system 105 is shown. The data processing system 105 can include or be used to implement a data processing system or its components. The architecture described in FIG. 4 can be used to implement the data processing system 105, the client device 110, the publisher platform 115, or the computing device 130. The data processing system 105 can include at least one bus 425 or other communication component for communicating information and at least one processor 430 or processing circuit coupled to the bus 425 for processing information. The data processing system 105 can include one or more processors 430 or processing circuits coupled to the bus 425 for processing information. The data processing system 105 can include at least one main memory 410, such as a random access memory (RAM) or other dynamic storage device, coupled to the bus 425 for storing information, and instructions to be executed by the processor 430. The main memory 410 can be used for storing information during execution of instructions by the processor 430. The data processing system 105 can further include at least one read only memory (ROM) 415 or other static storage device coupled to the bus 425 for storing static information and instructions for the processor 430. A storage device 420, such as a solid state device, magnetic disk or optical disk, can be coupled to the bus 425 to persistently store information and instructions.

The data processing system 105 can be coupled via the bus 425 to a display 400, such as a liquid crystal display, or active matrix display. The display 400 can display information to a user. An input device 405, such as a keyboard or voice interface can be coupled to the bus 425 for communicating information and commands to the processor 430. The input device 405 can include a touch screen of the display 400. The input device 405 can include a cursor control, such as a mouse, a trackball, or cursor direction keys, for communicating direction information and command selections to the processor 430 and for controlling cursor movement on the display 400.

The processes, systems and methods described herein can be implemented by the data processing system 105 in response to the processor 430 executing an arrangement of instructions contained in main memory 410. Such instructions can be read into main memory 410 from another computer-readable medium, such as the storage device 420. Execution of the arrangement of instructions contained in main memory 410 causes the data processing system 105 to perform the illustrative processes described herein. One or more processors in a multi-processing arrangement can be employed to execute the instructions contained in main memory 410. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

What is claimed is:

1. A system, comprising:
a data processing system comprising one or more processors, coupled with memory, configured to:
receive a cell data structure stored in a database comprising a plurality of identifiers of computing devices that accessed digital content;
receive a plurality of parameters linked with the plurality of identifiers;
determine, based on the plurality of parameters and using a model trained with machine learning, a plurality of importance levels indicating a contribution of the plurality of parameters to predict whether the computing devices accessed the digital content;
generate a hierarchy of the plurality of parameters according to the plurality of importance levels;
generate, based on the hierarchy of the plurality of parameters, a twin cell data structure that is a twin of the cell data structure comprising identifiers of computing devices that did not access the digital content; and
update the database to store, in another data structure of the database, the twin cell data structure comprising the identifiers of the computing devices that did not access the digital content.

2. The system of claim 1, comprising:
the data processing system to:
receive first values for the plurality of parameters, the first values linked with the plurality of identifiers;
receive a second plurality of identifiers of computing devices that did not access the digital content;
receive second values for the plurality of parameters, the second values linked with the second plurality of identifiers; and
determine, based on the first values for the plurality of parameters linked with the plurality of identifiers, the second values linked with the second plurality of identifiers, and the model trained with machine learning, the hierarchy of the plurality of parameters.

3. The system of claim 1, comprising: wherein the hierarchy of the plurality of parameters includes:
a first parameter of the plurality of parameters mapped to a first level of the hierarchy; and
a second parameter of the plurality of parameters mapped to a second level of the hierarchy below the first level.

4. The system of claim 1, comprising:
the data processing system to:
receive an indication of a predefined level of the hierarchy to rank a first parameter of the plurality of parameters;
wherein the hierarchy includes:
the first parameter mapped to the predefined level of the hierarchy; and
a second parameter of the plurality of parameters mapped to a second level below the predefined level based on the plurality of importance levels of the plurality of parameters.

5. The system of claim 1, comprising:
the data processing system to:
determine a first importance level of a first parameter of the plurality of parameters based on the model trained by machine learning;
determine a second importance level of a second parameter of the plurality of parameters based on the model trained by machine learning; and
determine the hierarchy to include the first parameter based on the first importance level and exclude the second parameter based on the second importance level.

6. The system of claim 1, wherein:
the model trained by machine learning is a random forest classification model.

7. The system of claim 1, comprising:
the data processing system to:
receive a criteria specifying a number of levels for the hierarchy;
determine importance levels of the plurality of parameters based on the model trained by machine learning;
select a portion of parameters from the plurality of parameters based on the importance levels of the plurality of parameters and the criteria, wherein a number of parameters of the portion of parameters is equal to the number of levels specified by the criteria; and
generate the hierarchy based on the portion of parameters selected from the plurality of parameters.

8. The system of claim 1, comprising:
the data processing system to:
identify a publisher of the digital content and second digital content;
identify a group of identifiers of a group of computing devices that accessed the second digital content but did not access the digital content; and
select the identifiers of computing devices for the twin cell data structure of the cell data structure from the group of identifiers based on the hierarchy.

9. The system of claim 1, comprising:
the data processing system to:
identify a first campaign of a publisher, the first campaign including the digital content;
identify a second campaign of the publisher, the second campaign including second digital content;
identify a group of identifiers of a group of computing devices that accessed the second digital content of the second campaign but did not access the digital content of the first campaign; and
select the identifiers of computing devices for the twin cell data structure of the cell data structure from the group of identifiers based on the hierarchy.

10. A method, comprising:
receiving, by a data processing system comprising one or more processors, coupled with memory, a cell data structure stored in a database comprising a plurality of identifiers of computing devices that accessed digital content;

receiving, by the data processing system a plurality of parameters linked with the plurality of identifiers;

determining, by the data processing system, based on the plurality of parameters and using a model trained with machine learning, a plurality of importance levels indicating a contribution of the plurality of parameters to predict whether the computing devices accessed the digital content; generate a hierarchy of the plurality of parameters according to the plurality of importance levels;

generating, by the data processing system, based on the hierarchy of the plurality of parameters, a twin cell data structure that is a twin of the cell data structure comprising identifiers of computing devices that did not access the digital content; and updating, by the data processing system, the database to store, in another data structure of the database, the twin cell data structure comprising the identifiers of the computing devices that did not access the digital content.

11. The method of claim 10, comprising:

receiving, by the data processing system, first values for the plurality of parameters, the first values linked with the plurality of identifiers;

receiving, by the data processing system, a second plurality of identifiers of computing devices that did not access the digital content;

receiving, by the data processing system, second values for the plurality of parameters, the second values linked with the second plurality of identifiers; and determining, by the data processing system, based on the first values for the plurality of parameters linked with the plurality of identifiers, the second values linked with the second plurality of identifiers, and the model trained with machine learning, the hierarchy of the plurality of parameters.

12. The method of claim 10, comprising:

determining, by the data processing system, the hierarchy of the plurality of parameters to include:
a first parameter of the plurality of parameters mapped to a first level of the hierarchy; and
a second parameter of the plurality of parameters mapped to a second level of the hierarchy below the first level.

13. The method of claim 10, comprising:

receiving, by the data processing system, an indication of a predefined level of the hierarchy to rank a first parameter of the plurality of parameters;

determining, by the data processing system, importance levels of the plurality of parameters based on the model trained by machine learning;

determining, by the data processing system, the hierarchy to include:
the first parameter mapped to the predefined level of the hierarchy; and
a second parameter of the plurality of parameters mapped to a second level below the predefined level based on the importance levels of the plurality of parameters.

14. The method of claim 10, comprising:

determining, by the data processing system, a first importance level of a first parameter of the plurality of parameters based on the model trained by machine learning;

determining, by the data processing system, a second importance level of a second parameter of the plurality of parameters based on the model trained by machine learning; and determining, by the data processing system, the hierarchy to include the first parameter based on the first importance level and exclude the second parameter based on the second importance level.

15. The method of claim 10, wherein:

the model trained by machine learning is a random forest classification model.

16. The method of claim 10, comprising:

receiving, by the data processing system, a criteria specifying a number of levels for the hierarchy;

determining, by the data processing system, importance levels of the plurality of parameters based on the model trained by machine learning;

selecting, by the data processing system, a portion of parameters from the plurality of parameters based on the importance levels of the plurality of parameters and the criteria, wherein a number of parameters of the portion of parameters is equal to the number of levels specified by the criteria; and generating, by the data processing system, the hierarchy based on the portion of parameters selected from the plurality of parameters.

17. One or more storage medium that store instructions thereon, that, when executed by one or more processors, cause the one or more processors to:

receive a cell data structure stored in a database comprising a plurality of identifiers of computing devices of a cell that accessed digital content;

receive a plurality of parameters linked with the plurality of identifiers;

determine, based on the plurality of parameters and using a model trained with machine learning, a plurality of importance levels indicating a contribution of the plurality of parameters to predict whether the computing devices accessed the digital content;

generate a hierarchy of the plurality of parameters according to the plurality of importance levels;

generate, based on the hierarchy of the plurality of parameters, a twin cell data structure that is a twin of the cell data structure comprising identifiers of computing devices that did not access the digital content; and update the database to store, in another data structure of the database, the twin cell data structure comprising the identifiers of the computing devices that did not access the digital content.

18. The one or more storage medium of claim 17, wherein the instructions cause the one or more processors to:

determine the hierarchy of the plurality of parameters to include:
a first parameter of the plurality of parameters mapped to a first level of the hierarchy; and
a second parameter of the plurality of parameters mapped to a second level of the hierarchy below the first level.

19. The one or more storage medium of claim 17, wherein the instructions cause the one or more processors to:

receive an indication of a predefined level of the hierarchy to rank a first parameter of the plurality of parameters;

determine importance levels of the plurality of parameters based on the model trained by machine learning;

determine the hierarchy to include:
the first parameter mapped to the predefined level of the hierarchy; and a second parameter of the plurality of parameters mapped to a second level below the predefined level based on the importance levels of the plurality of parameters.

20. The one or more storage medium of claim 17, wherein the instructions cause the one or more processors to:
determine a first importance level of a first parameter of the plurality of parameters based on the model trained by machine learning;
determine a second importance level of a second parameter of the plurality of parameters based on the model trained by machine learning; and
determine the hierarchy to include the first parameter based on the first importance level and exclude the second parameter based on the second importance level.

* * * * *